Sept. 25, 1962 W. H. W. SCHULLER 3,055,051
SPINNING OF GLASS OR OTHER THERMOPLASTIC MASSES FROM RODS
Filed June 20, 1958

INVENTOR
WERNER H.W. SCHULLER
By
Morgan, Finnegan, Durham & Pine

United States Patent Office 3,055,051
Patented Sept. 25, 1962

3,055,051
SPINNING OF GLASS OR OTHER THERMO-
PLASTIC MASSES FROM RODS
Werner Hugo Wilhelm Schuller, Fort Saskatchewan,
Alberta, Canada
Filed June 20, 1958, Ser. No. 743,416
Claims priority, application Germany June 21, 1957
5 Claims. (Cl. 18—8)

In a known and widely used process for the drawing filaments from glass or like thermoplastic substances, the ends of the glass rods are first plasticised until a drop of liquid glass is formed, which draws a filament along with it. The filament is then subjected to further treatment in accordance with the type of product to be produced therefrom.

It is also known to produce individual filaments from glass or other thermoplastic masses by forcing a liquid glass mass which is provided in a melting or supply vessel, through fine nozzles provided in the base of the vessel, or by drawing off the filaments directly from the nozzle.

In the two processes hereinbefore described the filament thus formed is drawn out in any known manner to the required thickness and wound on bobbins or is subjected to any other subsequent treatment.

The success of the so-called "rod process" is largely due to the fact that it affords the substantial advantage of ensuring that the raw material supplied in the form of exactly gauged glass rods results in filaments of uniform thickness. The disadvantage of this process is, however, that the rods which are automatically fed into the machine by rollers are of a finite length, and, after about one hour have to be replaced by fresh rods. For this purpose, it is necessary to stop the machine. There is also the disadvantage that a considerable rod length remains as waste remains, due to the clamped portion of the rod, and other structural conditions. Bearing in mind that apparatus for normal construction contains at least 100 rods, it will be understood that the replacement of these rods takes a considerable period of time and that the waste rods left represent a substantial percentage of the raw material.

In order to avoid the waste of rod ends, it has been proposed to weld the rods freshly fed to the machine to those present in the machine. As it was, however, impossible to anneal the rods at the welded positions, most rods broke at the welded positions in the feeding rollers so that in some cases production had to be interrupted for a considerable period of time.

As compared with the process hereinbefore described, the so-called "nozzle or jet process", in which the drawing-off of filaments proceeds from a melting vessel which contains a plurality of orifices, affords the advantage that it is possible for filaments to be drawn off over an extended period of time. The disadvantage of this process is that it does not ensure that filaments of uniform thickness are produced, that is to say of a thickness which is uniform throughout the filament as well as being uniform with respect to the other filaments produced. There are several reasons for this. First, the liquid glass which is in a hot state and which is drawn off at a high rate of speed, causes enlargement of the nozzle orifices within a comparatively short time. In addition, it is in practice extremely difficult to generate a temperature which is uniform over the whole area provided with nozzle orifices and, if pressure is used, it is equally difficult to generate a uniform pressure over the whole area. Since, however, generally the drawing-off speed is constant, the enlarged nozzles cause fluctuations in temperature and, if pressure is used, the uneven pressure produces filaments of uneven thickness. Bearing in mind, furthermore, that it is necessary for the base plate of the melting and supply vessel provided with orifices to be made of a highly heat-resistant material, it being practically only with the rare and expensive metal platinum which is suitable therefor, and also remembering that, due to the wear of the nozzles hereinbefore referred to, it is necessary for this base plate to be frequently replaced, then it will be understoood that the operation of such process must be uneconomical.

A further disadvantage of the "nozzle or jet process" is that its continuous operation is virtually obligatory. If the process is stopped, severe difficulties are then encountered. On re-heating the vessel or tank to re-start operation, decrystallisation or devitrification occurs with blockage of the nozzles, jets or bushings, so resulting in a further interruption of production.

In accordance with the invention, while the disadvantages hereinbefore described are overcome, the advantage of the so-called "rod process" herebefore referred to, that is to say the fact that it is possible to supply the raw material from which the individual filaments are produced in exactly controlled quantities, is nevertheless utilised.

The process of the invention renders possible a fully automatic and continuous formation of glass filament or other thermoplastic mass filament from rods, in which process labour and material are reduced and in which the thermal energy required at the draw-off position is fully utilised, inasmuch as this thermal energy does not radiate without being utilised, during periods of inactivity of the apparatus, which are essential to enable the rods to be replaced in the rod process.

According to the invention rods of glass or other thermoplastic material which are drawn-off from a supply device, are fed continuously and automatically, while standing loosely end to end one upon the other, to a heated bar or other member with holes in which the adjoining ends of the rods are joined, and from which simultaneously primary rods are formed which corresponding to the relation feeding speed to drawing-off speed preliminary rods of desired thickness are formed which while still in plastic state, are drawn out into filaments, freely and unguided by the application of a separate source of heat.

The temperature of the bar or other member may, for example, be in the range 800°–900° C. so that it may be made of steel. The rods, before and/or after joining or welding, may be of any suitable diameter and the fibre or filament may, for example have a diameter in the range 0.005–0.018 mm.

The drawing of the filaments from the end of the rod is preferably effected at a position at which the end of the rod is not in contact with any part of the apparatus. Thus glasses of high softening points, for example, borosilicate glasses, may be used without the necessity of providing parts of platinum or other metal of higher resistance to heat than steel.

The invention also relates to devices for carrying the process into effect.

The accompanying drawings show diagrammatically a substantially simplified construction of apparatus suitable for carrying out the process of the invention, the process being described in detail with reference to the drawings, in which.

Figure 1:
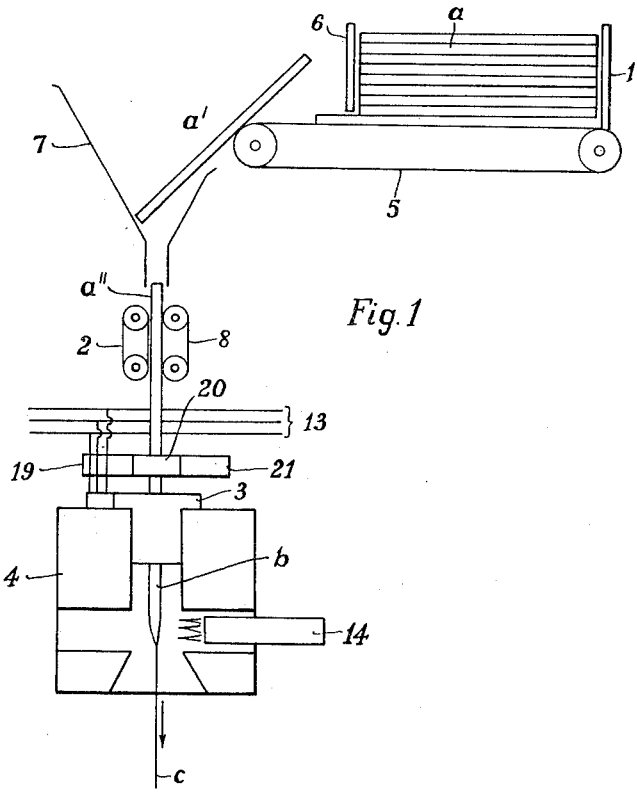
FIGURE 1 shows, on a reduced scale, the layout and relative coordination of an independent device representing apparatus for carrying out the process of the invention.

A feed and supply device, generally denoted by the reference numeral 1, receives the raw material in the form of glass rods *a* fed to the apparatus to pass the glass rods, which stand loosely end to end upon the other, to the feeding device which is generally denoted by the reference numeral 2. The feeding device passes the rods automatically and continuously to a fusing or heating device, generally denoted by the reference numeral 3, in which the rod ends are joined and by which the primary rods, denoted by the reference *h* are formed from which the filament *c* are produced by the application of heat from a heater which is generally denoted by the reference numeral 4.

In the construction illustrated in the drawings, the feeding and supply device consists of a conveyor belt 5 which may be driven intermittently or continuously, and by which the rods *a* are withdrawn from a funnel 6 or the like, and moved in a horizontal position to an inclined sliding surface 7 on which they are erected to a vertical position, so that in each case the rod *a'* stands loosely end to end on the preceding rod *a"*.

The invention is not limited to the embodiment illustrated in the drawings, it being also possible to use other devices which have a similar effect as, for example, an inclined plane on which the rods are disposed in a vertical position and which, if necessary or desired may be vibrated by suitable means, for example by a cam.

The feed means 2, serves the purpose of moving on the rods automatically and continuously, in some circumstances with slight pressure, and to pass them to the fusing or heating device 3. To achieve this, means of a widely varying kind, such as pulleys, rollers or discs with profiles or friction linings, or, as shown in the drawings, the conveyor belt 8 may be used which may be provided on one side, or on both sides.

The rod is introduced by the feed means into the specific boring provided for it in the bar 9 in which the rod *a"* is joined to the "residue *a"*" of the preceding rod which has been converted into a plastic (but not liquid) state, and from this plastic mass there is formed, with the assistance of the slight pressure exerted by the rod "*a*," the preliminary rod *b*. The thickness of the preliminary rod is chosen according to the fibre diameter. In case very fine fibres are to be drawn off a small diameter of the preliminary rod is chosen. The joining operation proceeds in such manner that the consecutive rod, being still cold, is dipped into the plastic mass of the preceding rod in the manner shown in FIGURE 2, for it has been found that it is in this manner that a really homogeneous consolidation is ensured, whereas, for example, butt-welded rod ends may easily cause thread breakages during the subsequent drawing-out into filaments.

Figure 2:
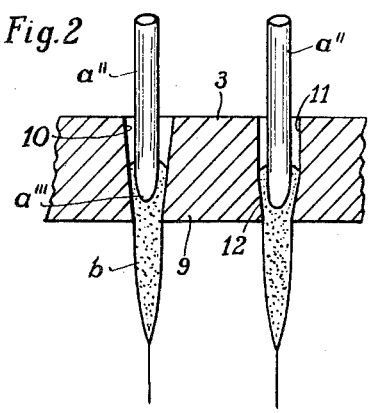
FIGURE 2 shows a substantially full size part-sectional view of one component.

The borings in the bar 3 into which the rods *a"* are introduced and from which the preliminary rods *b* are formed, may be of cylindrical or slightly conical construction, or a cylindrical portion may merge into a conical portion. FIGURE 2 shows, by way of example, on the left a slightly conical boring 10 and on the right an initially cylindrical boring 11 which merges into a conical portion 12.

It is an essential feature of the invention that the glass disposed in the borings 10 and 11 of the bar 9 for forming the preliminary rods *b*, is constantly maintained in a merely plastic (as opposed to a completely fluid) state. For this purpose the bar 9 may be heated in any suitable manner, for example by induction, as shown in the three-phase network diagram 13 in FIGURE 1. By these means, the perforated bar can be maintained at temperatures which permit the bar to be made of ordinary heat-resistant steel.

The preliminary rod issuing from the openings of the borings 10 and 11 in the plastic state is then heated by means of the heater, generally denoted by 4, at a suitable position, to the increased temperature necessary to draw out the filaments. In the construction shown in FIGURE 1, it is a gas burner 14 which is used for this purpose. It is also possible to use any other heating device, as for example, heating rods or bars, or carbon.

The bar may be made in one piece by which the direct heating thereof is facilitated; it may, however, also be divided into several small individual blocks of advantageously uniform size. It is of advantage to use this construction in as much as cleaning or replacement of damaged parts are thereby facilitated. Moreover, an exact spacing of the holes is also facilitated thereby, as the rods *a"* fed in a cold state are fed in an exact laterally spaced relation, whereas the perforated bar, into the openings of which they are dipped, is in the hot state which has to be taken into consideration in making the holes when the bar is manufactured. Thus, if for example the lateral distance between the rods fed is 10 mm., the borings 10 and 11 in the bar would, for example, have to be bored with a 9.8 mm. spacing in order to ensure that the borings have the required 10 mm. spacing after heating and expansion of the bar. Spacing errors as may occur during the production as well as during operation, for example as a result of an uneven cross-section of the heating material or as a result of an obstruction of the gas burner nozzles, may more readily be eliminated when individual blocks are provided, whereas when a single continuous bar is used, difficulties may arise due to the cumulation of such spacing errors.

Figure 3:
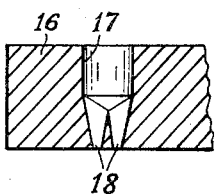
FIGURE 3 shows a part-sectional view of the component shown in FIGURE 2, but of a slightly different construction.

FIGURE 3 which is a further development of the invention, shows a part-sectional view of a further construction of a bar, or of an individual block. In this construction, the bar 16 presents cylindrical borings 17 which merge into two or more cylindrical or conical borings 18. The continuous filament drawing process provided in accordance with the invention is rendered even more commercially attractive by virtue of the fact that it is thus possible to draw-off simultaneously several filaments from each rod.

In addition to the fact hereinbefore referred to of it being possible to feed the rods individually and thus to feed the glass mass which is to be drawn-out into filaments in exactly controlled quantities, the division of the melting and rod-joining space into a plurality of individual small spaces affords the additional advantage that it is possible to maintain the mass in the individual borings at the desired temperature at which it is converted into a merely plastic state. Observance of the specific temperature by which the normal heat-resistant steel of the bar is not affected, and prevention of devitrification are thus ensured.

In order to screen the fed glass rods *a"* and the devices for the storage and feeding thereof from the heat produced by the heating devices 4 and 13 respectively, a cooling and screening device 19 may be provided which comprises the rod guides 20 and the cooling channels 21 interposed.

The process of the invention, and apparatus for carrying the invention into effect permit continuous feeding of the raw material consisting of rods, thus rendering it possible for the filaments to be drawn-off continuously, and eliminating the requirement of having to replace old rod residues by fresh rods so that a considerable saving in labour, working time and material is thus achieved.

It is an additional advantage of this process that, at the positions at which the glass mass is in direct contact with parts of the apparatus, it is only heated to the specific softening or plasticising temperature which is sufficient to form primary rods, so that those parts of the apparatus in which the glass mass is received, can be made of a material which need not be as highly heat-resistant as is the expensive platinum. The high temperatures required for the actual drawing-off process are, however, disposed at the positions at which the glass mass is not in direct contact with parts of the apparatus. Blocking or obstruction of the borings of the perforated bar are avoided as the orifices of the borings therein are relatively large, and the expenditure in thermal energy is reduced and the dangerous devitrification is avoided, in as much as the temperatures at these positions are not as high as the temperatures required to maintain the glass mass in the liquid state. The division of the plastic glass mass into a plurality of smaller subsidiary units facilitates cooling, cleaning, and replacement of the parts in which the glass mass is received. Finally, the feeding of individual rods renders it possible for the glass mass to be supplied in exactly controlled quantities to the drawing-off positions.

I claim:

1. A method of producing continuous filaments from rods of thermoplastic materials comprising the steps of continuously supplying rods of thermoplastic material, loosely positioning said rods in vertically-disposed abutting end-to-end relationship, guiding said individual abutting rods for entry into the inlet end of an associated tapered boring, applying heat to said boring to cause rods fed thereto to be heated to a plastic mass in said boring, advancing the leading end of successive rods continuously into the plastic mass of its predecessor in said tapered boring, extruding said plastic mass in the form of an endless homogeneous extruded rod from the outlet end of its associated boring by the advance of successive rods into said boring, applying additional heat continuously to the end of said endless plastic rod for converting the end thereof to a liquid state and drawing off filaments from said liquified end of said endless rod.

2. The method, according to claim 1, including the steps of cooling the rods prior to feeding into the inlet end of said boring and subdividing the plastic mass in each boring into at least two extrusion paths.

3. Apparatus for the continuous production of filaments from rods of thermoplastic material comprising in combination a rod storage member, said member supporting said rods in generally horizontal disposition, a rod guide member for positioning rods delivered thereto in individual, vertical, abutting end-to-end relationship, means for delivering rods from said storage member into said guide member, means for maintaining rods disposed vertically end-to-end by said guide member, a rod heating device having a number of bores formed therethrough, the inlet sections of said bores being formed slightly larger in diameter than said rods, means for admitting vertically-disposed rods into said bores, the number of said bores corresponding to the number of rods being simultaneously supplied to said heating device, means for heating said bores to cause rods fed thereto to be heated to a plastic mass in their associated bores, an outlet section for each of said bores, means including the advance into said bores of successive rods into the plastic mass of its predecessors in said bore for extruding said plastic mass in the form of an endless homogeneous rod from the outlet section of said bores, and second heating means spaced from said rod heating device for converting the tips of said plastic endless rods into a liquid state from which filaments are drawn.

4. Invention as defined in claim 3 wherein said rod guide means comprises a vertically-disposed tapered funnel and including a conveyor for delivering rods from said storage member into said funnel.

5. The invention as defined in claim 3 wherein said bores are tapered in decreasing cross-section from the inlet toward the outlet sections thereof and wherein said rods are supported in spaced relationship to the sidewalls of their associated bores.

References Cited in the file of this patent

UNITED STATES PATENTS

| | | |
|---|---|---|
| 1,228,495 | Tanzi | June 5, 1917 |
| 1,371,222 | Burke et al. | Mar. 15, 1921 |
| 1,558,398 | Rose | Oct. 20, 1925 |
| 1,857,791 | Peiler | May 10, 1932 |
| 2,286,653 | Siegfried | June 16, 1942 |
| 2,495,956 | Cook | Jan. 31, 1950 |
| 2,605,502 | Culpepper et al. | Aug. 5, 1952 |
| 2,657,428 | Upton | Nov. 3, 1953 |
| 2,696,285 | Zenlea | Dec. 7, 1954 |
| 2,755,506 | Weber | July 24, 1956 |
| 2,922,187 | Young et al. | Jan. 26, 1960 |

FOREIGN PATENTS

| | | |
|---|---|---|
| 52,224 | France | June 21, 1943 |
| 884,733 | France | May 3, 1943 |
| 156,202 | Great Britain | July 14, 1921 |
| 452,810 | Great Britain | Aug. 31, 1936 |
| 605,001 | Great Britain | July 14, 1948 |